Dec. 6, 1949     A. H. MOSHER     2,490,149
PIPE JOINT
Filed Oct. 18, 1944
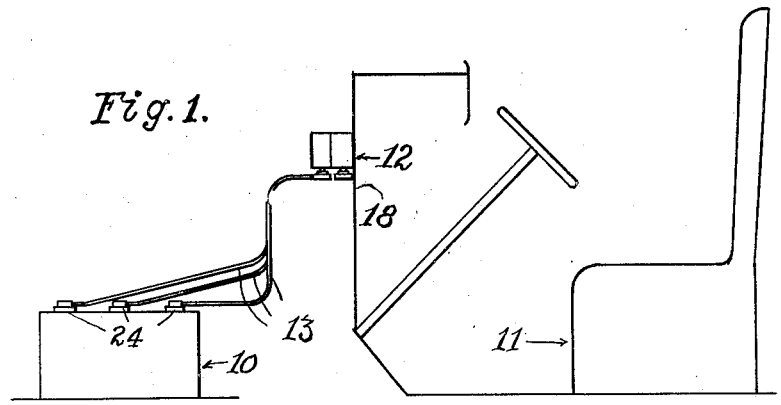
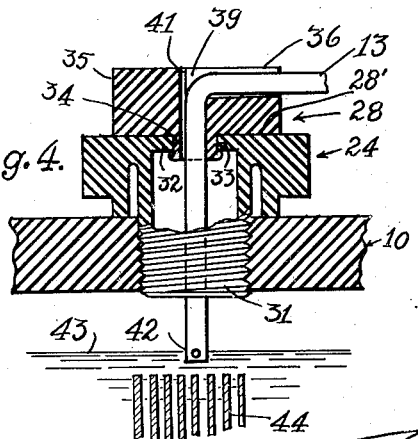
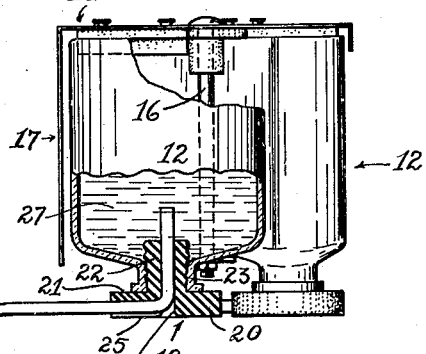
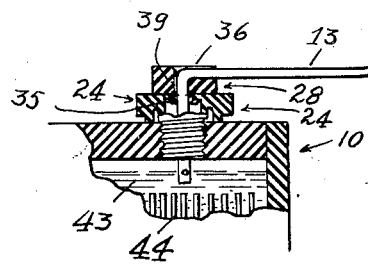
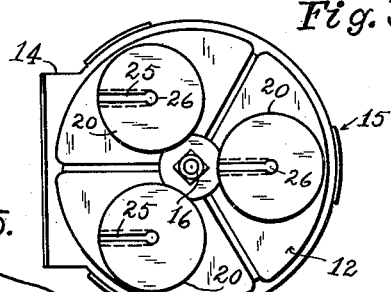
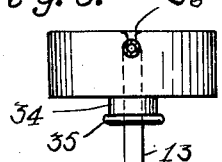
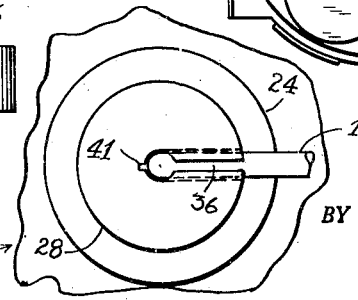
INVENTOR.
ASA H. MOSHER
BY Patented Dec. 6, 1949

2,490,149

UNITED STATES PATENT OFFICE 2,490,149

PIPE JOINT

Asa H. Mosher, Westfield, N. J.

Application October 18, 1944, Serial No. 559,281

2 Claims. (Cl. 285—30)

This invention relates to a device for maintaining the electrolyte of a storage battery at a given level and relates more particularly to an improvement in one of the parts or elements used in such a device.

As shown in my Patent No. 2,209,788 an apparatus is provided for automatically supplying liquid to a storage battery, the liquid flowing through a conduit from a supply tank to the battery to maintain the electrolyte at a selected level.

An apparatus of the above character is, especially when used on an automobile, subjected to considerable shock and relatively rough treatment. It is, therefore, necessary to combine sturdiness with ease of assembly and one of the important elements from a maintenance standpoint is the mode of support for a conduit passing through a battery cap into the electrolyte.

As shown in my patent above mentioned, the battery cap is provided with an insert or tapered unit to support the fluid conduit and although this has been found practical and satisfactory, it is subject to certain disadvantages which the present invention serves to eliminate.

It is an object of the present invention therefore to provide a guide-support or nipple to more effectively hold a conduit relating to a battery cap.

Another object of the invention is to provide a conduit supporting nipple which may be applied to any standard cap upon the performance of a simple drilling operation.

Another object of the invention is to provide a conduit supporting nipple which may be readily applied or removed from a cap and for holding a portion of the conduit against endwise movement when bent to extend laterally from the axis of the nipple.

Another object of the invention is to provide a nipple of soft rubber having a portion compressible to pass through an aperture in the wall of a battery cap and be retained by the expansion of the provided compressible portion.

Other objects and advantages of the invention will be evident from the following description together with the accompanying drawings in which—

Fig. 1 is a schematic side elevational view of an apparatus of the type to which the present invention relates.

Fig. 2 is an enlarged view of a fluid tank and battery, partly broken away to show a nipple constructed in accordance with the present invention and showing the nipple as applied to a battery and to a fluid tank.

Fig. 3 is a view of the underside of the tanks or containers used to supply fluid to batteries.

Fig. 4 is an enlarged view in cross section, of a conduit supporting guide or nipple as applied to a battery cap.

Fig. 5 is a top view of one of the nipples in position on a battery cap, and

Fig. 6 is a side view of the nipple showing the fluid conduit with a portion thereof held in a lateral slot.

The present invention is shown as applied to an apparatus as that illustrated in the aforementioned patent, and includes a battery 10 as used in an automobile part which latter is shown schematically and indicated by the numeral 11 in Fig. 1, and a plurality of reservoirs or containers. The containers are indicated as a whole by the numeral 12. Each of the containers is provided with a conduit 13 for the passage of fluid to the several cells of the battery 10. In the present apparatus three containers or reservoirs are provided and for the purpose of conserving space are of wedge shape or sections of a cylinder, and so formed that when arranged with the flat sides or radial planes in contact the outer surfaces form a continuous cylindrical surface as shown in Fig. 3. These containers are held by a supporting frame 14 comprising clamps 15 held by a central bolt 16 provided with a nut and washer to retain the containers in position. A bracket 17 is provided whereby the group of containers may be secured at the proper elevation to the dash-board 18 of an automobile.

Each container is provided with a stopper or nipple 19 having a head or body portion 20 with a shoulder 21 to seat on the container and an extension 22 fitting the neck 23 of a container 12. When the reservoirs or containers are mounted on the dash-board 18 the conduits 13 extend to the battery caps 24 of the battery 10. For the purpose of economy of material and for practical reasons it is desirable to have the conduits extend laterally from the nipples 19 of the containers and at the same time to provide means for holding the conduits against endwise movement during shocks and jars to which the apparatus is subjected when used on a vehicle such as an automobile.

The head 20 of the nipple 19 is therefore provided with a slot 25 leading to a passage 26 in the extension 22 through which one end of the conduit extends into a liquid 27 to feed the battery. The slot 25 is so proportioned with respect to the outside diameter of the conduit that the walls of the slot firmly frictionally engage and hold the conduit with a portion thereof substantially at a right angle to the longitudinal axis of the passage 26. The nipple 19 is preferably made of an elastic material such as soft rubber which yields to the insertion of the conduit into the slot and contracts to hold it in place.

The combined nipple and conduit retainer as described for a container 12 is also embodied in a nipple 28 provided for holding the conduit in fixed relation to the electrolyte of the battery.

As shown more clearly in Fig. 4 the battery 10 is shown provided with a standard cap 24 having the usual screw plug 31 and a thin top wall 32. In accordance with the present invention my apparatus may be readily installed by mounting the containers on the dash-board and then simply drilling a hole 33 in the cap wall 32 to receive the nipple. The nipple 28 is provided with an extension 34 projecting from a body portion 35 which latter provides a shoulder 28' to seat on the top of the cap 24. The nipple is of an elastic material such as soft rubber and the hole or aperture 33 in the cap may be of a diameter substantially the same as the outside diameter of the extension 34 which is provided with a flange 35 of greater diameter than that of the extension 34 (see Fig. 6). By reason of the flexibility of the nipple the extension 34 and flange 35 may be compressed to enter the aperture 33 and permitted to expand to grip the wall 32 and hold the nipple with the body portion firmly seated on the cap. The body portion 35 of the nipple 28 is also provided with a lateral slot 36 of less width than the outside diameter of the conduit 13. When a portion of the conduit is pressed into position in the slot it will be held by the side walls there to prevent endwise movement of the conduit extending from a passage 39 provided in the nipple. For the purpose of admitting air to the cell of the battery the passage 39 is provided with a slot 41 (see Fig. 5).

When in position and held by a nipple 28 the conduit may be first adjusted to bring the end 42 thereof to the proper depth in the electrolyte 43 just above the plates 44. The conduit being of flexible material, preferably soft rubber, may then be bent at right angles and a portion inserted into and retained by the slot 36 thus holding the conduit in its fixed relative position and leading away from the battery cap to give a practical disposition of the conduit length extending to the container.

As described above the liquid container in accordance with the present invention is in the form of a compact, substantially cylindrical body made up of several separate containers. In the present case three containers are employed each of which constitutes a segment of the resultant cylindrical body. The containers are held by suitable means so that the conduits leading therefrom may readily extend to the battery. It will be evident that although the containers are shown with the conduits extending from the bottom thereof, that the container may be reversed with the nipples uppermost and the conduits leading out from the tops of the containers. In practice it has been found that in some cases it is more desirable to reverse the containers from the position shown in the drawing.

The novel arrangement of the container as shown makes the present device more practical, particularly when used with the novel form of nipple since the conduits when held by the slots of the nipple are retained and disposed for the free flow of liquid while at the same time are held against moving too freely under vibration.

In an apparatus of the kind to which the present invention relates, it is essential to provide a structure which may be easily and economically installed. The means for holding the conduit relative to the container and to the battery cap constitutes an important part of the device. Heretofore it was necessary to provide a special form of battery cap, whereas the present invention makes it possible, by a simple drilling operation to modify any standard cap to receive a nipple for supporting the conduit and for holding or locking it in position against accidental endwise movement.

Although a preferred embodiment of the invention is shown, and described herein, it is to be understood that modifications may be made therein without departing from the spirit and scope of the appended claims.

I claim:

1. A nipple for holding a conduit in a given position while extending through an aperture in the cap of a storage battery comprising a body portion of soft elastic material, for seating on said cap, an extension, a flange on said extension, said flange having an outside diameter greater than that of said aperture and capable of being compressed for passage through said aperture and expandible to cause the flange to retain the nipple in position, said nipple having a passage for a flexible conduit, the body portion of said nipple having a transverse slot extending from said passage to receive and hold said flexible conduit when a portion thereof is pressed into frictional engagement with the walls of said slot.

2. A nipple for holding a conduit in a given position while extending through an aperture in the top wall of the cap of a storage battery comprising a body portion of soft elastic material, for seating on said cap, an extension of greater length than the thickness of the top wall of said cap, a flange on said extension, said flange having an outside diameter greater than that of said aperture and capable of being compressed for passage through said aperture and expandible on the underside of the top wall of said cap to cause the flange to retain the nipple in engagement with the upper and lower surfaces of the top wall of said cap, said nipple having a passage for a flexible conduit, the body portion of said nipple having a transverse slot extending from said passage to receive and hold said flexible conduit when a portion thereof is pressed into frictional engagement with the walls of said slot.

ASA H. MOSHER.

REFERENCES CITED

The following references are of record in the file of this patent:

UNITED STATES PATENTS

| Number | Name | Date |
|---|---|---|
| 1,135,894 | Havens | Apr. 13, 1915 |
| 1,275,149 | Gammeter | Aug. 6, 1918 |
| 1,357,153 | Dicken | Oct. 26, 1920 |
| 1,383,411 | Longstreet | July 5, 1921 |
| 2,039,009 | Lampman | Apr. 28, 1936 |
| 2,135,158 | Wolford | Nov. 1, 1938 |